Nov. 4, 1969         R. L. JOHNSON         3,475,779
CANTILEVER PLATFORM EXTENSION
Filed March 27, 1968
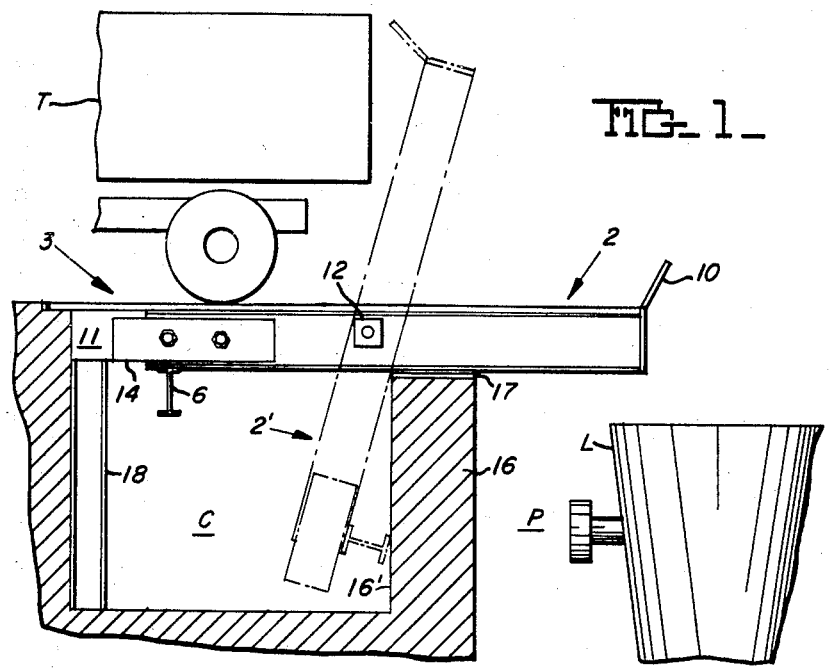
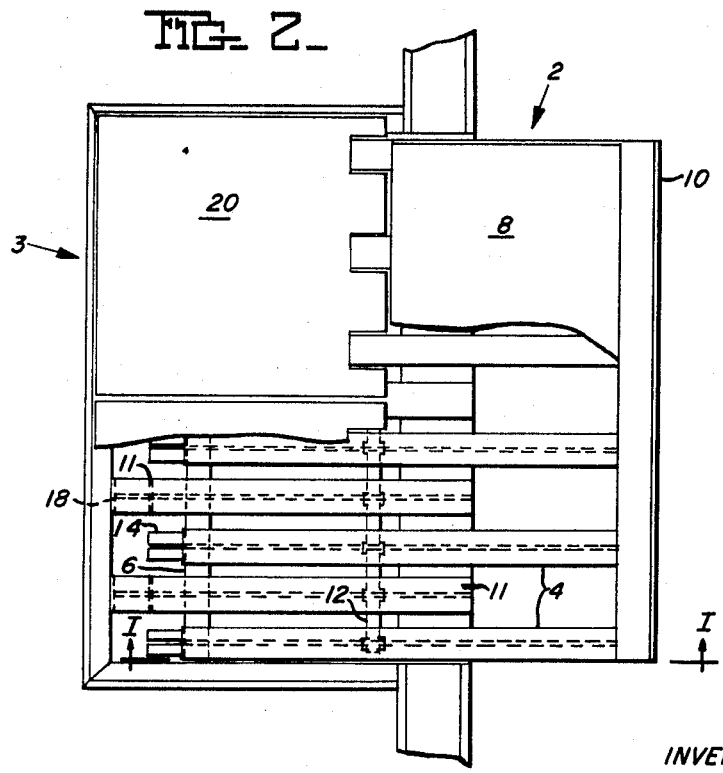
INVENTOR
ROBERT L. JOHNSON
By Frank C Manak III
Attorney United States Patent Office 3,475,779
Patented Nov. 4, 1969

3,475,779
CANTILEVER PLATFORM EXTENSION
Robert L. Johnson, Calumet City, Ill., assignor to United States Steel Corporation, a corporation of Delaware
Filed Mar. 27, 1968, Ser. No. 716,603
Int. Cl. E01d 15/08; B65g 11/12
U.S. Cl. 14—71
2 Claims

ABSTRACT OF THE DISCLOSURE

A cantilever platform extension for extending the load-carrying area of a dock beyond the edge of the main portion of the dock platform. The platform extension is pivotally connected to the main portion of the dock platform and is weighted so that its outwardly extending load-carrying end tilts upwardly when there is no load placed on it.

---

This invention relates to a platform extension that retracts from its extending position when no load is placed on it.

Although the invention is not thus limited, the platform extension is particularly useful where material is to be dumped from an elevated truck into a ladle or bucket. One such example is in steelmaking, where dolomite is carried by dump trucks to a platform adjacent a ladle pit near the open hearth furnaces. A ladle is lowered into the pit by an overhead crane, and the dolomite is dumped from the truck into the ladle. The ladle is then picked up by the crane and carried away. In order to convey the dolomite from the truck to the ladle, conventional practice is to attach a chute to the side of the pit during the dumping operation. Then, the chute must be removed or swung out of the way while the ladle is being lifted out of the pit. Besides the inconvenience of removing the chute each time the ladle is raised from the pit, the chute has another disadvantage. The material being dumped often spills over the sides of the chute and onto the floor of the pit. Thus some material is lost and the pit must be cleaned periodically.

It is therefore an object of my invention to provide a retractable platform extension which enables trucks to dump material into a ladle or other container without using a chute or incurring any of the above mentioned problems experienced with chutes.

This and other objects will be more apparent from the following detailed description of my invention and the attached drawings in which:

FIGURE 1 is a side elevation of a retractable platform extension employed at a ladle pit for loading dolomite, the ladle pit being shown in a section along line I—I of FIGURE 2;

FIGURE 2 is a top view of the platform extension of FIGURE 1, with portions thereof broken away.

Referring to FIGURE 1, a ladle L is placed in pit P and is ready to receive a load of dolomite from truck T. A platform extension 2, at one edge of a dock in the form of a main platform 3, is designed to support the truck T with its rear end above the ladle L. The platform extension 2 includes parallel, spaced apart pivoted beams 4 (FIGURE 2) that are connected together at their left-hand ends by a transverse beam 6, and are covered at their right-hand extending portions by a cover plate 8. This cover plate is designed to support the rear end of truck T above the pit P. A wheel stop 10 is mounted along the right-hand edge of the platform extension 2 to prevent the truck T from rolling off the platform.

The main portion of the platform 3 includes parallel, spaced apart stationary beams 11. A long hinge rod 12 pivotally connects the beams 4 of platform extension 2 to the beams 11, thereby making the platform extension 2 rotatable relative to the fixed main portion of platform 3. When the platform extension 2 is in its fully extended position, the left-hand portions of the beams 4 (FIGURE 2) lie between the beams 11.

The beams 4 have counterweights 14 attached to their left-hand ends, so that when unloaded, the platform extension 2 swings to its chain-line position 2' (FIGURE 1). A cavity C is provided beneath the left-hand portion of the platform extension 2 to permit this end to swing downwardly to its chain-line position. A wall 16 separates the cavity C from the pit P, and the top of the wall 16 supports the right-hand portion of platform extension 2 when there is a load on the extension. Shims 17 are placed on top of wall 16 to fix the limit of the horizontal loaded position of the platform extension 2. When the platform extension 2 is unloaded, the side 16' of wall 16 facing cavity C acts as a stop engaging the transverse beam 6, thereby limiting the backward travel of the free end of the extension 2.

The wall 16 also supports the front ends of the stationary beams 11. The rear ends of beams 11 are supported by columns 18 inside the cavity C. Cover plates 20 fixed to the tops of stationary beams 11 provide a smooth top surface for the main portion of the platform 3, so that vehicles and other loads may move easily across the platform onto cover plate 8 of platform extension 3.

In operation, the truck T, carrying material to be dumped into ladle L, is backed onto the main portion of platform 3. The platform extension 2 is initially in its chain-line position 2' (FIGURE 1), due to the moment of counterweights 14. As the truck T is backed, the rear of the truck strikes the bumper stop 10 and gradually pushes the platform extension 2 until it rotates to its horizontal, solid-line position of FIGURE 1. The counterweights 14 are positioned so that the platform extension 2 is only slightly out of balance when unloaded, thereby easing the work the truck must do in pushing the platform extension 2 to its horizontal position.

When the platform extension 2 is horizontal, and the dump truck T is backed onto it, the material is dumped directly into the ladle L without requiring a chute. Since the end of the truck is directly over the mouth of the ladle L, little if any dolomite spills outside the ladle.

After the dumping operation, the truck is driven forward off the platform extension 2 and onto the main portion of platform 3. The platform extension 2 then swings back to its chain-line position 2' (FIGURE 1), with the transverse beam 6 striking the wall 16 to limit the backward travel of the extension 2. With the platform extension 2 thus out of the way, a chain hoist is lowered into pit P to remove the ladle L filled with dolomite. An empty ladle is then put in its place, ready for another load of material to be dumped in the same manner as has been described.

While one embodiment of my invention has been thus shown and described, other embodiments and modifications will be apparent with the scope of the appended claims.

I claim:
1. Apparatus for extending the load carrying area of a dock comprising a main platform extending inwardly from the edge of said dock, a plurality of laterally spaced fixed beams perpendicular to and extending inwardly from the said edge of said dock, said main platform being supported on said fixed beams, a pivot shaft supported by and extending transversely of said fixed beams near the end portions thereof adjacent said dock edge, a plurality of extension beams between said fixed beams and pivoted on said shaft at points between the inner and outer ends thereof, an extension platform supported on the said outer ends of said extension beams, a counterweight on the said inner ends of said extension beams for pivoting said extension beams and the extension platform carried thereby to a position extending upwardly from said dock outer edge, and a cross-beam connecting the inner ends of said extension beams for engagement with said fixed beams to form a stop for holding said extension beams and platform in an operative position extending horizontally outwardly from said dock edge.

2. Apparatus as defined in claim 1 characterized by the provision of a vertical support at said dock edge on which the said outer end portions of said fixed beams are supported, said vertical support engaging said cross-beam to form a stop for holding said extension beams and platform in said upwardly extending position.

References Cited

UNITED STATES PATENTS

| | | | |
|---|---|---|---|
| 1,723,885 | 8/1929 | Patterson | 14—17 |
| 1,905,947 | 4/1933 | Morgan | 14—71 |
| 2,592,919 | 4/1952 | Loomis | 15—71 |
| 3,087,178 | 4/1963 | Loomis | 14—71 |

JACOB L. NACKENOFF, Primary Examiner